US009373031B2

(12) United States Patent
Ghessassi (10) Patent No.: US 9,373,031 B2
(45) Date of Patent: Jun. 21, 2016

(54) SYSTEM AND METHOD FOR DOCUMENT ALIGNMENT, CORRECTION, AND CLASSIFICATION

(71) Applicant: Digitech Systems Private Reserve, LLC, Greenwood Village, CO (US)

(72) Inventor: Karim Ghessassi, Parker, CO (US)

(73) Assignee: Digitech Systems Private Reserve, LLC, Greenwood Village, CO (US)

( * ) Notice: Subject to any disclaimer, the term of this patent is extended or adjusted under 35 U.S.C. 154(b) by 47 days.

(21) Appl. No.: 14/174,674

(22) Filed: Feb. 6, 2014

(65) Prior Publication Data

US 2014/0270545 A1    Sep. 18, 2014

Related U.S. Application Data

(60) Provisional application No. 61/782,842, filed on Mar. 14, 2013, provisional application No. 61/782,968, filed on Mar. 14, 2013, provisional application No. 61/783,012, filed on Mar. 14, 2013, provisional application No. 61/783,045, filed on Mar. 14, 2013, provisional application No. 61/782,893, filed on Mar. 14, 2013.

(51) Int. Cl.
*G06K 9/00* (2006.01)
*G06F 17/30* (2006.01)
*G06F 17/24* (2006.01)

(52) U.S. Cl.
CPC .......... *G06K 9/00483* (2013.01); *G06F 17/248* (2013.01); *G06F 17/30011* (2013.01); *G06F 17/30598* (2013.01)

(58) Field of Classification Search
None
See application file for complete search history.

(56) References Cited

U.S. PATENT DOCUMENTS

| 6,327,388 | B1 * | 12/2001 | Zhou ................ G06F 17/30259 382/203 |
| 6,738,154 | B1 * | 5/2004 | Venable .................. G06K 9/32 358/1.15 |
| 6,744,933 | B2 | 6/2004 | Lai et al. |
| 6,778,703 | B1 * | 8/2004 | Zlotnick ............ G06K 9/00449 382/218 |
| 7,844,896 | B2 * | 11/2010 | Ohashi .................. G06T 11/206 715/243 |
| 8,515,208 | B2 | 8/2013 | Minerich |
| 8,595,235 | B1 * | 11/2013 | Sampson ........... G06K 9/00483 707/737 |

(Continued)

OTHER PUBLICATIONS

O'Callaghan, JF. "An Alternative Definition for Neighborhood of a Point". IEEE Transactions of Computers. 1975.*

*Primary Examiner* — Kim Vu
*Assistant Examiner* — Molly Delaney
(74) *Attorney, Agent, or Firm* — Sheridan Ross P.C.

(57) ABSTRACT

A template document and a reference document that contains objects (e.g. text objects) are received, for example, from a scanner. A plurality of common objects between the template document and the reference document are identified. Locations of the plurality of common objects in the template document and the reference document are identified. One or more distances between the locations of the plurality of common objects in the template document and the reference document are also identified. A determination is made whether the one or more distances between the plurality of common objects in the template document and the reference document are substantially the same. In response to determining that the one or more distances between the plurality of common objects in the template document and the reference document are substantially the same, the template document and the reference document are grouped as common documents.

20 Claims, 7 Drawing Sheets

(56) References Cited

U.S. PATENT DOCUMENTS

| | | | | |
|---|---|---|---|---|
| 8,880,540 B1* | 11/2014 | Sampson | ............ | G06K 9/00463 707/756 |
| 2007/0047782 A1* | 3/2007 | Hull | ................... | G06K 9/00442 382/124 |
| 2008/0123901 A1* | 5/2008 | Podilchuk | ............ | G06K 9/6201 382/103 |
| 2009/0067729 A1* | 3/2009 | Turkelson | ......... | G06F 17/30707 382/224 |
| 2009/0208115 A1* | 8/2009 | Abe | ....................... | G06T 3/4069 382/209 |
| 2009/0265363 A1* | 10/2009 | Lai | ......................... | G06Q 10/10 |
| 2011/0243477 A1* | 10/2011 | Minerich | ............. | G06K 9/6206 382/294 |
| 2014/0281910 A1* | 9/2014 | Ghessassi | .......... | G06K 9/00483 715/234 |

* cited by examiner

SYSTEM AND METHOD FOR DOCUMENT ALIGNMENT, CORRECTION, AND CLASSIFICATION

RELATED U.S. PATENT APPLICATION DATA

This application claims the benefit under 35 U.S.C. §119 (e) of U.S. Provisional Application No. 61/782,842, filed Mar. 14, 2013, entitled "PAGE ALIGNMENT AND CORRECTION," U.S. Provisional Application No. 61/782,968 entitled "PAGE CLASSIFICATION," filed Mar. 14, 2013, U.S. Provisional Application No. 61/783,012 entitled "PAGE CLUSTERING," filed Mar. 14, 2013, U.S. Provisional Application No. 61/783,045 entitled "PAGE RECONSTRUCTION" filed Mar. 14, 2013, and U.S. Provisional Application No. 61/782,893 entitled "SMART ANCHOR" filed Mar. 14, 2013, all of which are incorporated herein by reference.

TECHNICAL FIELD

The systems and methods disclosed herein relate to document management systems and in particular to document management systems that classify documents.

BACKGROUND

Today, there is an increased need to be able to sort documents. For instance, large companies receive a large of number of invoices or contracts from a variety of sources and vendors. Sorting these documents manually can be very time consuming and expensive. To address this issue, solutions have been created to automatically classify/cluster documents. For example, there are document management systems that classify documents based on word counts. These solutions alleviate some of the problems associated with document classification. However, word counting solutions are not always accurate in sorting documents. These types of solutions typically have an 80% accuracy rate in sorting a large number of documents. This still requires that the sorted documents to be manually reviewed in order to correctly sort all the documents. What is needed is a solution that can easily classify documents with a much higher degree of accuracy.

SUMMARY

Systems and methods are provided to solve these and other problems and disadvantages of the prior art. A template document and a reference document that contains objects (e.g. text objects) are received, for example, from a scanner. A plurality of common objects between the template document and the reference document are identified. Locations of the plurality of common objects in the template document and the reference document are identified. One or more distances between the locations of the plurality of common objects in the template document and the reference document are also identified. A determination is made whether the one or more distances between the plurality of common objects in the template document and the reference document are substantially the same. In response to determining that the one or more distances between the plurality of common objects in the template document and the reference document are substantially the same, the template document and the reference document are grouped as common documents.

In another embodiment, relative angles between the common objects in the template document and the reference document are identified. In response to the relative angles being substantially the same, the template document and the reference document are grouped as common documents.

DETAILED DESCRIPTION

Figure 1:
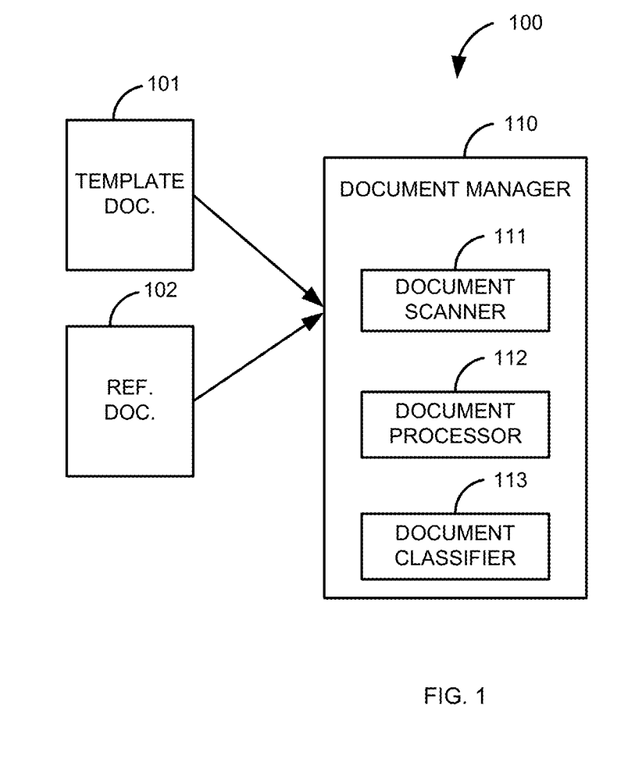
FIG. 1 is a block diagram of a first illustrative system for grouping documents.

FIG. 1 is a block diagram of a first illustrative system 100 for grouping documents. The first illustrative system 100 comprises a document manager 110. The document manager 110 can be any hardware/software that can be used to manage documents, such as a scanner, a multifunction peripheral, a fax machine, a network based software application, and/or the like.

The document manager 110 comprises a document scanner 111, a document processor 112, and a document classifier 113. The document scanner 111 can be any hardware/software that can be used to scan documents, such as a scanner, a network scanner, a fax machine, a multifunction peripheral, and/or the like. The document processor 112 can be any hardware/software that can process and manage documents. The document classifier 113 can be any hardware/software that can be used to classify/group documents.

FIG. 1 also includes a template document 101 and a reference document 102. The template document 101 and/or the reference document 102 may be physical documents that are scanned in by the document scanner 111. The template document 101 and/or the reference document 102 may be generated by a device, such as a camera. The template document 101 and/or the reference document 102 can be generated directly by a program, such as a word processing program, a spreadsheet, a presentation program, a graphical program, a picture management program, and/or the like. The template document 101 and/or the reference document 102 can be in various forms, such as a Tagged Image File Format (TIFF) file, a Portable Document Format (PDF), a Rich Text Format (RTF), a Extended Markup Language (XML) document, a Hyper Text Markup Language (HTML) document/web page, a Graphics Interchange Format (GIF) file, and/or the like.

The processes described herein describe systems and methods being implemented for documents. However, the methods and systems may also be implemented based on a number of pages, paragraphs, pictures, and/or the like.

The document processor 112 receives the template document 101. The template document 101 can be received from various sources, such as the document scanner 111, a network scanner, a networked device, a database, a camera, and/or the like. The template document 101 can include a variety of objects. For example, objects in the document (the template document 101 and the reference document 102) can include a text object, a picture object, an icon object, a graphic object, a logo object, a number, a symbol, a table, a graphical element, metadata in the template document 101/reference document 102, and/or the like. A text object may include a single letter, a word, a sentence, a paragraph, a heading, a page, a phrase, a footer, a header, a name, a marked change text, and/or the like. An object may comprise multiple objects. For instance, a picture may comprise multiple objects such as a car, a person, a building, and/or the like. A text object such as a sentence may comprise multiple text objects. Objects can be predefined. For example, objects can include specific words or phrases.

The document processor 112 receives the reference document 102. The reference document 102 can be received in any manner as described above for the template document 101. The document processor 112 identifies objects in the template document 101 and the reference document 102. This can be based on various factors, such as a grid, a pixel location, a specific point in or around the object, and/or the like. For example, using a grid pattern, the document processor 112 can identify the location of the object aaa in the template document 101 in FIG. 3 by determining its center point based on a number of millimeters from the top and side of the document (e.g., using horizontal and vertical grids).

The document processor 112 can identify objects in a variety of different ways. For example, as discussed above, the document processor 112 can identify various kinds of objects, such as text objects, image objects, picture objects, and/or the like.

Once the objects are identified, the locations of the objects can be identified and stored. For example, the document processor 112 can start by identifying the locations of the objects using a grid pattern that starts from the top left hand corner of a page and scans the page on a row by row basis (e.g., similar to readying text). Using this process, the document processor 112 will identify the text object iii in the template document 101 of FIG. 3 first and the text object hhh in the template document 101 of FIG. 3 last. Using this same process for the reference document 102 of FIG. 3, the document processor 102 will identify the text object zzz first and the text object bbb last. The system could use any point and/or different points to start identifying objects in the template document 101 and the reference document 102. For example, if the template document 101 of FIG. 3 contained a logo in the upper right hand corner, the document processor 112 could use the logo as a starting point to identify objects. Alternatively, the document processor 112 could use a specific text object as a starting point. For instance, the word "Total" in an invoice could be used as a starting point for identifying objects in the template document 101 and the reference document 102. In another embodiment the location is determined based on a location of a first character of a text object such as a word or sentence. In this example, a horizontal and a vertical vector are used for each object.

Alternatively scalars can be used. For example, a text object would have a scalar for the height of the text object and a scalar for the length of the text object. The scalar for the height would have a starting point and an ending point. Likewise, the scalar for the length would have a starting and an ending point.

Figure 3:
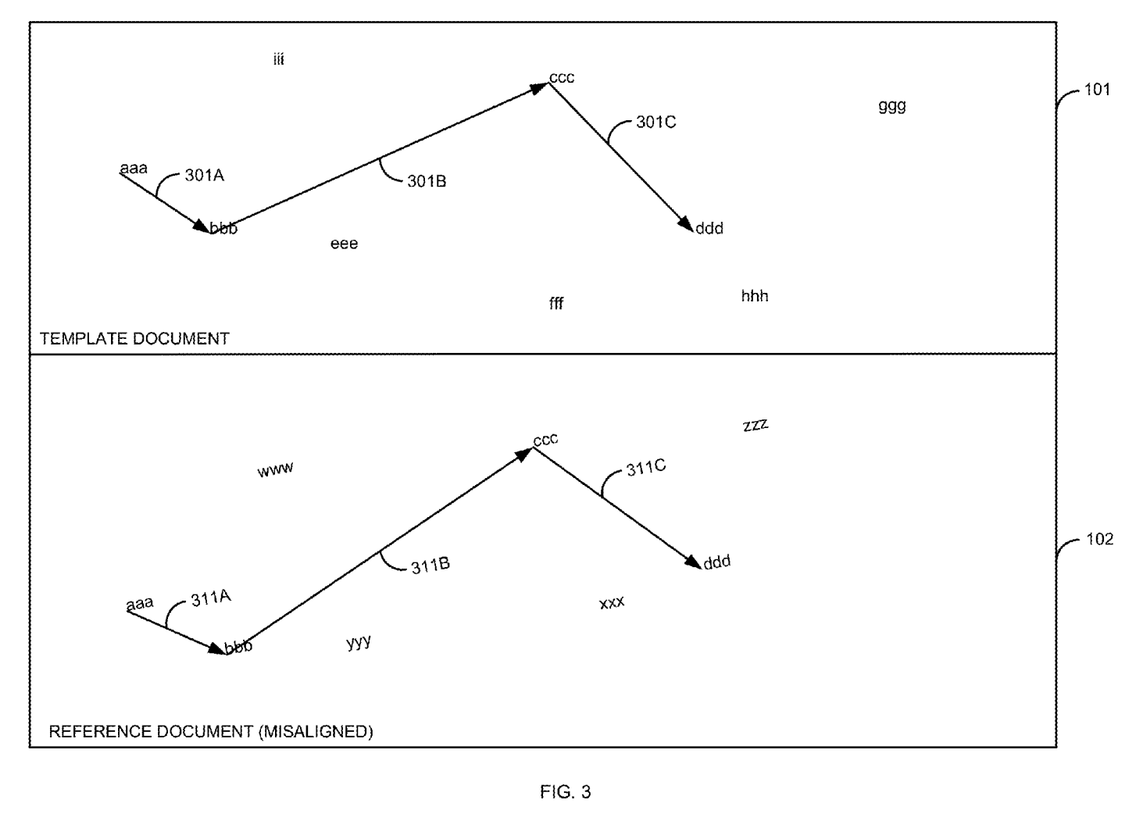
FIG. 3 is a diagram of how distances between objects in a document are used to group documents.

In one embodiment, the orientation of the object as shown in FIG. 3, in the reference document 102 is used for determining the location. In this example, the horizontal/vertical grid is based on the orientation of the scanned objects in the misaligned reference document 102 in FIG. 3.

In another embodiment, the system uses the first object on the left side (i.e., the text object aaa) as the reference point of where the horizontal/vertical grid would be used for adjusting the orientation of the grid so that each of the text objects' orientation would be based on the misaligned orientation.

Alternatively, if using pixels, the reference point can be based on the pixel location of a point in or around the object. Pixel locations could also be used to identify object locations of multiple objects in pictures and/or graphics. All the above process for determining locations may be based on only the common objects between the template document 101 and the reference document 102.

The document processor 112 identifies common objects between the template document 101 and the reference document 102. For example, as shown in FIG. 3, the document processor 112 has identified that the template document 101 and the reference document 102 have text objects aaa-ddd in common. Text objects eee-iii in the template document 101 in FIG. 3 and text objects www-zzz in reference document 102 are not common objects. The document processor 112 can identify multiple common objects that are the same. For example, the document processor 112 can identify multiple text objects "the" in a document or page. The identical objects can be distinguished based on their location.

The document processor 112 identifies locations of the common objects in the template document 101. For example, as illustrated in FIG. 3, the document processor 112 has identified the locations of the common objects aaa-ddd. The document processor 112 can identify the common objects in various ways. For example, using the processes described above for identifying objects.

The document processor 112 identifies the distances between the locations of the common objects in the template object 101. For example, in FIG. 3, the document processor 112 has identified the distance 301A (the distance between the text objects aaa and bbb), the distance 301B (the distance between the text objects bbb and ccc), and the distance 301C (the distance between the text objects ccc and ddd).

The document processor 112 identifies the locations of the common objects in the reference document 102 (e.g., in a similar manner as the template document 101). The document processor 112 identifies the distances between the locations of the common objects in the reference document 102. For example, in FIG. 3, the document processor 112 has identified the distance 311A (the distance between the text objects aaa and bbb), the distance 311B (the distance between the text objects bbb and ccc), and the distance 311C (the distance between the text objects ccc and ddd).

The identification of common objects and the distances between the common objects in the template document 101 and the reference document 102 can be accomplished in various ways. The document processor 112 can use a known object name (e.g., a company name on an invoice or contract) as a starting point in the template document 101. For example, in FIG. 3, the company name may be the text object aaa. The text object aaa in both the template document 101 and the reference document 102 is used as a starting point for calculating the distances 301A-301C and 311A-311C and/or the relative angles 402A-402B and 412A-412B. The starting point can be based on the first common object relative to a known point, such as the lower left hand corner. Alternatively, the starting point may be based on where the document processor 112 starts scanning for objects.

The document processor 112 determines if the distances between the common objects in the template document 101 and the common objects in the reference document 102 are substantially the same. The distances may be substantially the same based various factors, such as a given percentage of variance (i.e., based on a 5% plus or minus variance that may occur as part of the scanning process). Typically, the distances will slightly vary based on the scanning process.

If the distances between the common objects in the template document 101 and the distances between the common objects in the reference document 102 are substantially the same, the document classifier 113 groups the template document 101 and the reference document 102 as common documents. The document classifier 113 can group documents based on rules for defining and identifying objects. For example, objects can be identified based the object being a word, a phrase, a number, a symbol, a table a graphical element, a header, a footer, and/or the like. If the distances are not substantially the same, the document classifier 113 groups the template document 101 and the reference document 102 as not common documents.

If there are additional reference documents 101, the above process is repeated for the additional reference documents 102. This allows grouping of multiple reference documents 101.

The illustrative system in FIG. 1 has been described as using distances between objects to group documents. However, in other embodiments, relative angles can be used separately or in addition using the distances between objects as previously described. In one embodiment, the relative angles are used in conjunction with the distances. When the document processor 112 identifies the distances between the locations of the common objects in the template document 101, the document processor also identifies relative angles between the common objects in the template document 101. The relative angles between the common objects in the template document 101 may be based on an orientation of respective objects in the template document 101/reference document 102. This is illustrated in FIG. 3 where the document processor 112 has identified the relative angles 402A (the relative angle between aaa, bbb, and ccc) and the relative angle 402B (the relative angle between bbb, ccc, and ddd) in the template document 101. The document processor 112 also identifies relative angles 412A and 412B for the common objects in the reference document 102.

In addition to determining the distances as discussed previously, the document processor 112 determines if the relative angles between the template document 101 and the reference document 102 are substantially the same. If the relative angles and the distances are substantially the same, the document classifier 113 classifies the documents as being common documents.

The above process describes using relative angles for text objects. However, for other types of objects, determining relative angles it may be more difficult. For example, if a picture object is misaligned, the orientation of the picture object may be more difficult to determine. One solution is for the document processor 112 to orient the picture object based on the geometric shape of the object. For example, if the picture object is a square object, the square of the picture object can be used to determine the relative angles. If the picture object is upside down, the document processor 112 can use objects within the picture to determine the correct orientation of the picture object. For example, if the picture object has a person who is upside down, this can be used to determine if the template document 101 or the reference document 102 are upside down. The combination of both text objects and picture objects can be used to determine the orientation and relative angles in a page or document. For example, text within a picture object can be used to orient a document or page.

In an alternative embodiment, the system only uses relative angles between common objects. The distances between the common objects are not used.

In another embodiment, other factors, such as a height, a width, a font, and a Dots Per Inch (DPI) of one or more of the common objects in the template document 101/reference document 102 can be used to further determine that the template document 101 and the reference document 102 are common documents. For Example, if the common objects in the template document 101 are in a different font from the reference document, the document classifier can group the documents as not common documents even if the distances were substantially the same. This may also be used with or without using the distances or relative angles to classify documents.

Figure 2:
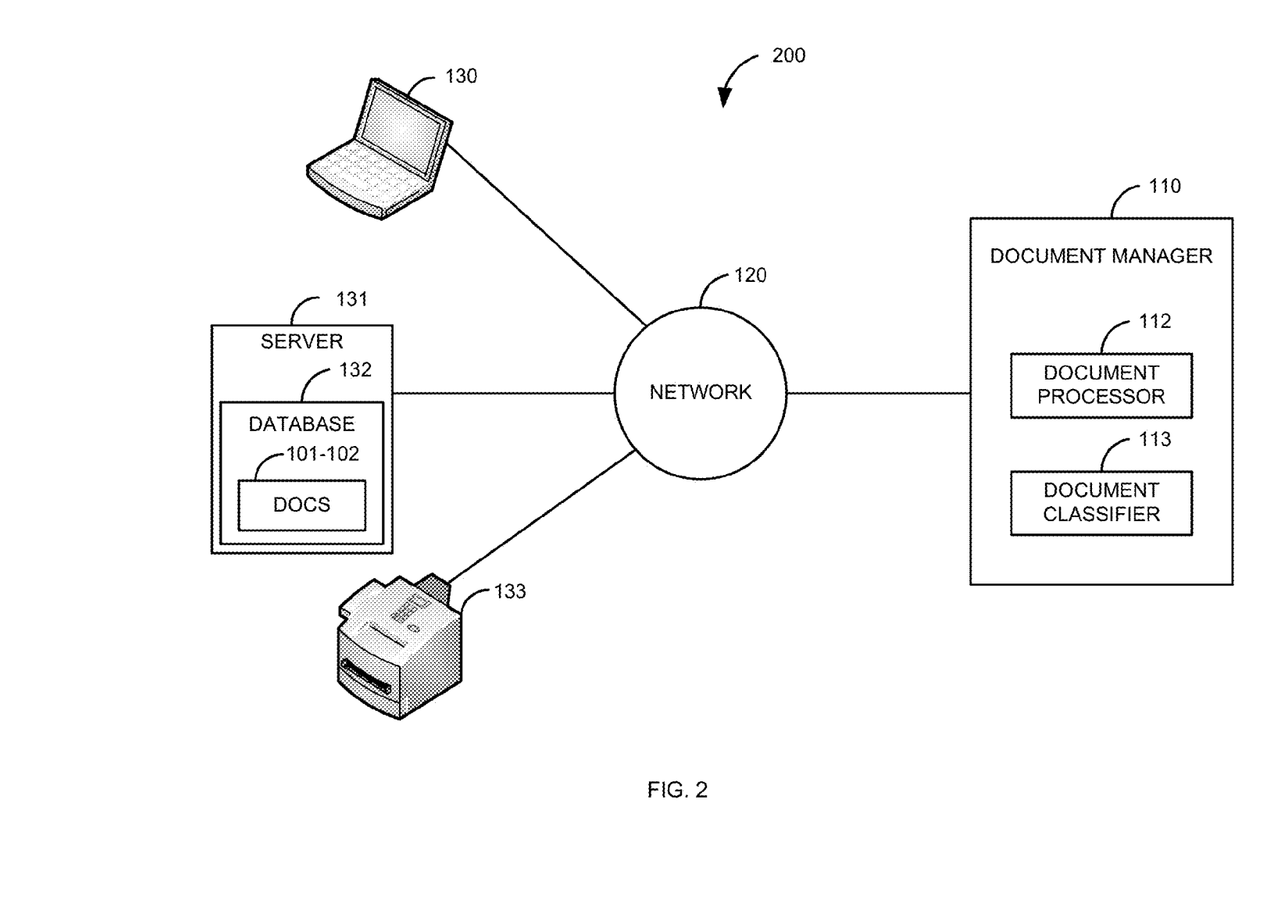
FIG. 2 is a block diagram of a second illustrative system for grouping documents.

FIG. 2 is a block diagram of a second illustrative system 200 for grouping documents. The second illustrative system 200 is an illustration of the system of FIG. 1 in a networked environment. The second illustrative system 200 comprises a computer 130, a server 131, a network scanner 133, a network 120, and the document manager 110.

The computer 130 can be any computing device, such as a personal computer, a Personal Digital Assistant (PDA), a telephone, a smart telephone, a laptop computer, a tablet computer, and/or the like. The server 131 can be any hardware/software that can manage documents 101/102, such as a file server, a database server, a web server, and/or the like. The server 131 further comprises a database 132. The database 132 can be any type of database, such as relational database, an object oriented database, a directory service, a file system, and/or the like. The database 132 comprises the template document 101 and the reference document 102. In this illustrative embodiment, the document manager 110 only comprises the document processor 112 and the document classifier 113.

The document manager 110 is connected to a network 120. The network 120 can be or may include any network that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 120 can use a variety of protocols, such as Ethernet, Internet Protocol (IP), 802.11G, Simple Network Management Protocol (SNMP), and the like.

The document processor 112 can receive documents from the devices 130, 131, and 132 on the network 110. For example, a user at computer 130 could create the template document 101 or fill out a reference document 102 that is either sent directly to the document processor 112 or stored in the database 132. A user at computer 130 could fill out an invoice using template 101 and send it to a company for processing. The invoice (102) could then be stored in the database 132 for processing by the document processor as described in FIG. 1.

Alternatively, the network scanner 133 could be used to scan the template document 101 and/or the reference document 102 for storage in the database 132. The scanned documents 101/102 could be sent directly to the document processor 112 from the network scanner 133.

In another embodiment, the document processor 112 can periodically retrieve reference documents 102 from the file server 131 via the database 132 for processing. This way, invoices/contracts can be processed based on pay periods or other time periods.

FIG. 3 is a diagram of how distances between objects in a document are used to group documents. FIG. 3 comprises an exemplary template document 101 and an exemplary reference document 102. The template document 101 comprises common text objects aaa-ddd. The template document 101 comprises text objects eee-iii that are not common text objects. The template document 101 comprises distance 301A (the distance between text objects aaa and bbb), distance 301B (the distance between text objects bbb and ccc), and distance 301C (the distance between text objects ccc and ddd).

In this example, the reference document 102 comprises common text objects aaa-ddd and uncommon text objects www-zzz. The reference document 102 comprises distance 311A (the distance between text objects aaa and bbb), distance 311B (the distance between text objects bbb and ccc), and distance 311C (the distance between text objects ccc and ddd). Also note that the reference document 102 is misaligned. A document can be misaligned when scanned when it is skewed during the scanning process. Likewise, documents may scanned upside down or sideways. Even though the reference document 102 (or the template document 101) may be misaligned, upside down, or sideways, the process still will correctly group documents.

To illustrate the use of the template document 101 and the reference document 102, consider the following example. Company A provides services for company B. Company B receives a first invoice (the template document 101) from company A. Later company B receives a second invoice from company A (the reference document 102). The two invoices are stored in the database 132. The document processor 112 receives the first and second invoices (101 and 102) from the database 132. The document processor identifies the common objects between the first invoice 101 and the second invoice 102 (text objects aaa-ddd). The document processor 112 identifies the locations of the common objects (aaa-ddd) in the first invoice 101. The document processor 112 identifies the distances 301A, 301B, and 301C between the common objects in the first invoice 101.

The document processor 112 identifies the locations of the common objects (aaa-ddd) in the second invoice 102. The document processor 112 identifies the distances 311A, 311B, and 311C between the common objects in the second invoice 102. The document processor 102 determines that the distances 301A & 311A, 301B & 311B, and 301C & 311C are substantially the same (in spite of the misalignment because the distances are relative to each other). The document classifier 113 groups the first invoice 101 and the second invoice 102 as common documents based on the distances being substantially the same.

The above process determines that the documents are common documents based on the premise that the distances are substantially the same. However, some documents may be scanned using a different scanning resolution. For example, a document may be scanned at 50% of its original size. This means that the document is half the size of the original. However, the documents can still be grouped by using a relative distance. For example, if the template document 101 distance 301A was 1 inch and the distance 301B were 4 inches, a relative distance for 311A would be one half inches and two inches respectively for a document that was scanned at 50%. If the ratio of all the distances 301A-301C have the same relative ratio as the distances 311A-311C (e.g., the distances 311A-311C are all 50% of the distances 301A-301C) then the documents would be deemed common documents even though the reference document 102 was scanned at 50% of what the template document 101 was scanned. This allows the system to use relative distances to detect common documents.

Figure 4:
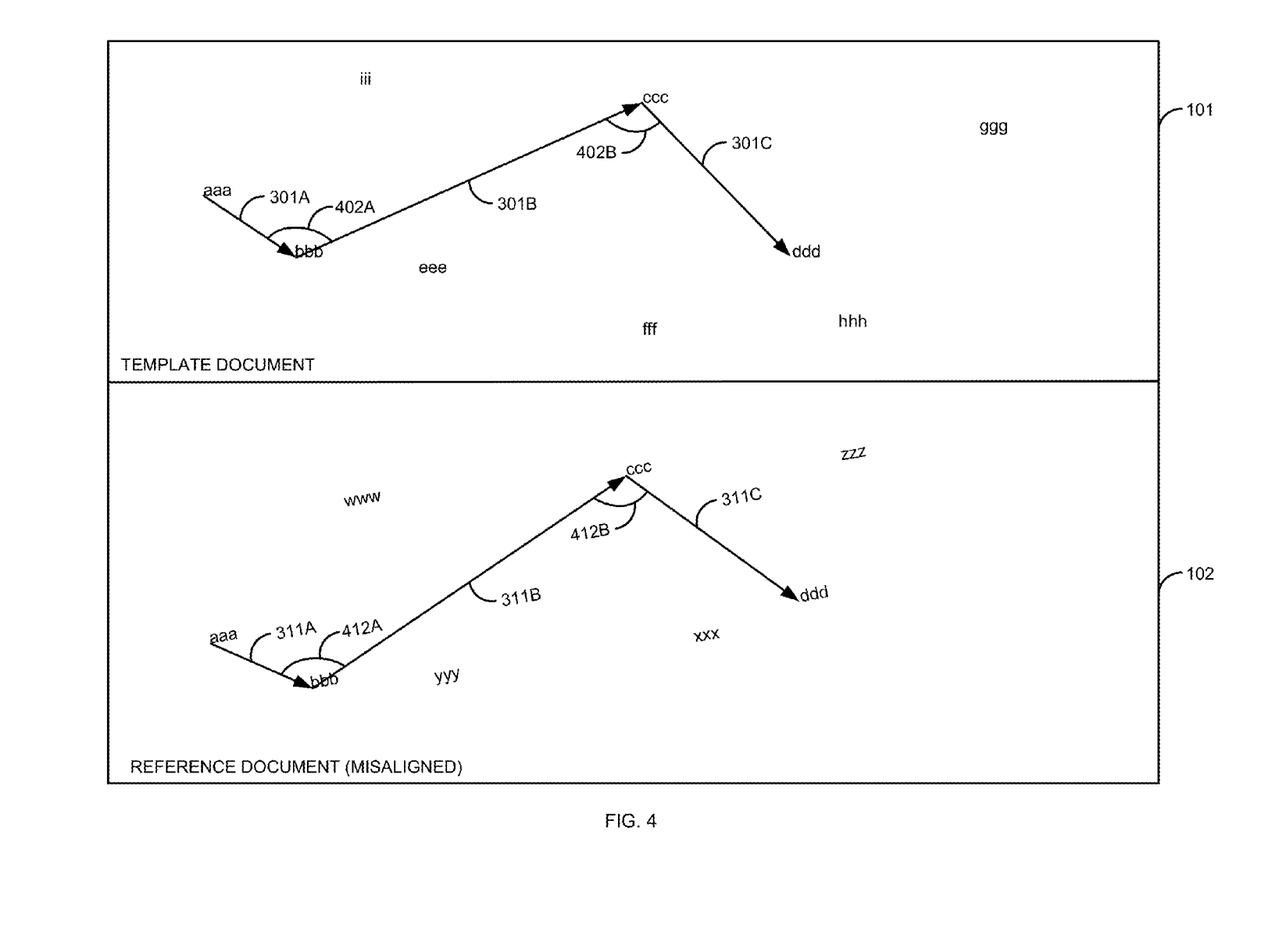
FIG. 4 is a diagram of how distances and relative angles between objects in a document are used to group documents.

FIG. 4 is a diagram of how distances and relative angles between objects in a document are used to group documents. To further illustrate how relative angles can be used, consider the previous example of Company A and Company B. In addition to calculating the locations and distances 301A-301C in the first invoice 101 and the locations and distances 311A-311C in the second invoice 102, the document processor 112 also determines the relative angle 402A for the angle associated with text objects aaa, bbb, and ccc and the relative angle 402B for the text objects bbb, ccc, and ddd. The document processor also determines the relative angle 412A for the angle associated with the text objects aaa, bbb, and ccc and the relative angle 412B for the angle associated with text objects bbb, ccc, and ddd. In FIG. 4, the relative angles 412A and 412B in the reference document 102 are the same as the relative angles 402A and 402B, even though the reference document 102 is misaligned. The document processor 112 determines if the relative angles (402A/412A and 402B/412B) are substantially the same. In response to the relative angles 402A/412A and 402B/412B being substantially the same, the document classifier 113 groups the first invoice 101 and the second invoice 102 in a common group.

In the above example, the relative angles 402 and 412 are defined as relative to each other. However, in other embodiments, the relative angles 402 and 412 may be determined based a difference relative position, such as a common point in each document 101/102.

In FIGS. 3-4, the process for determining distances and angles is based on going from one object to another in a serial pattern. However, other methods of stepping though objects may be used. For example, the distances/angles may be based on at a plurality of serial patterns, a star pattern, a plurality of star patterns, and a tree pattern, a plurality of tree patterns, a mesh pattern, a random pattern, and a combination of these. For instance, if a star pattern were used for FIG. 3, the distances would be calculated based on a distance from aaa to each of the other common objects (e.g., aaa-bbb, aaa-ccc, and aaa-ddd). The patterns could be based on a per paragraph instead of per page. For example, a serial pattern like described in FIGS. 3 and 4 could be used for each paragraph in a document.

The process described above have been described based on two pages to determine if the distances/relative angles of common objects are substantially the same. However, in other embodiments, the process can be accomplished across multiple pages. For example, the process could determine the common objects for multiple pages instead of on a page by page basis. If relative angles are used, the relative angles across two or more pages may be used. Likewise, the distances across pages may be used for common objects between the pages.

Figure 5:
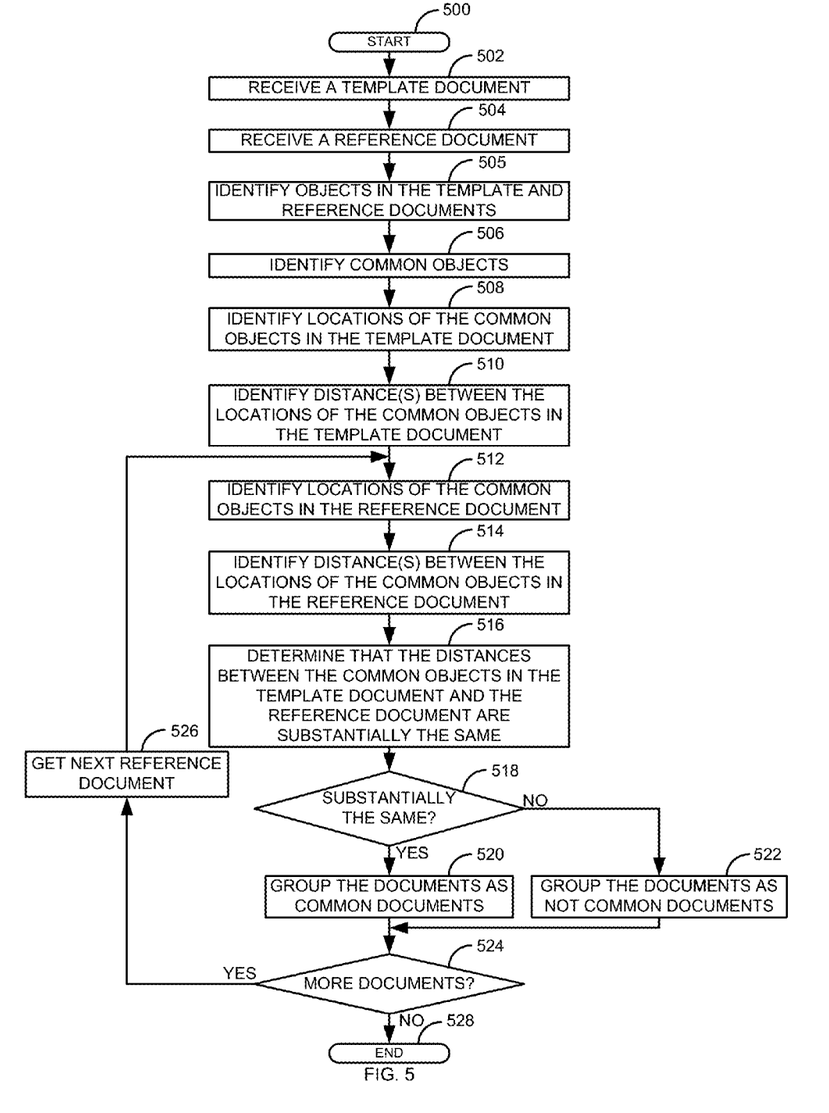
FIG. 5 is a flow diagram of a process for grouping documents using distances between objects in the documents.
Figure 6:
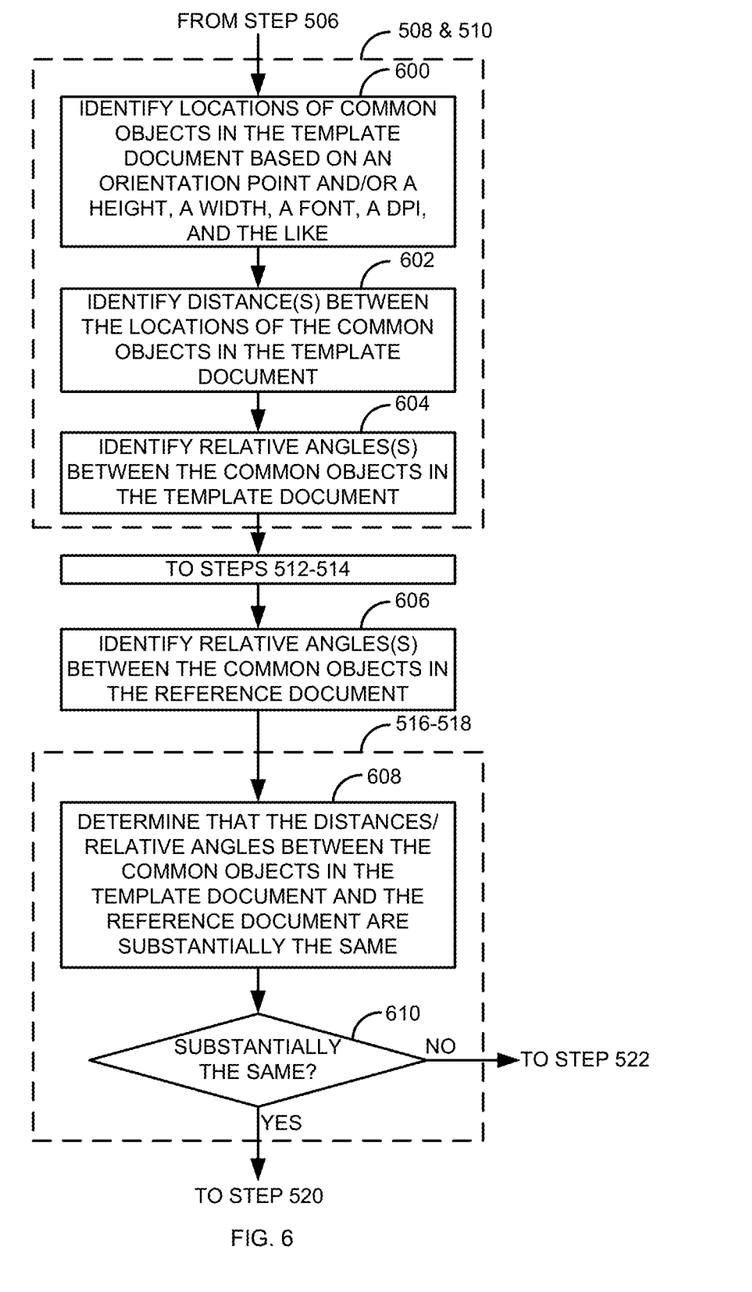
FIG. 6 is a flow diagram of a process for grouping documents using distances and relative angles between objects in the documents.
Figure 7:
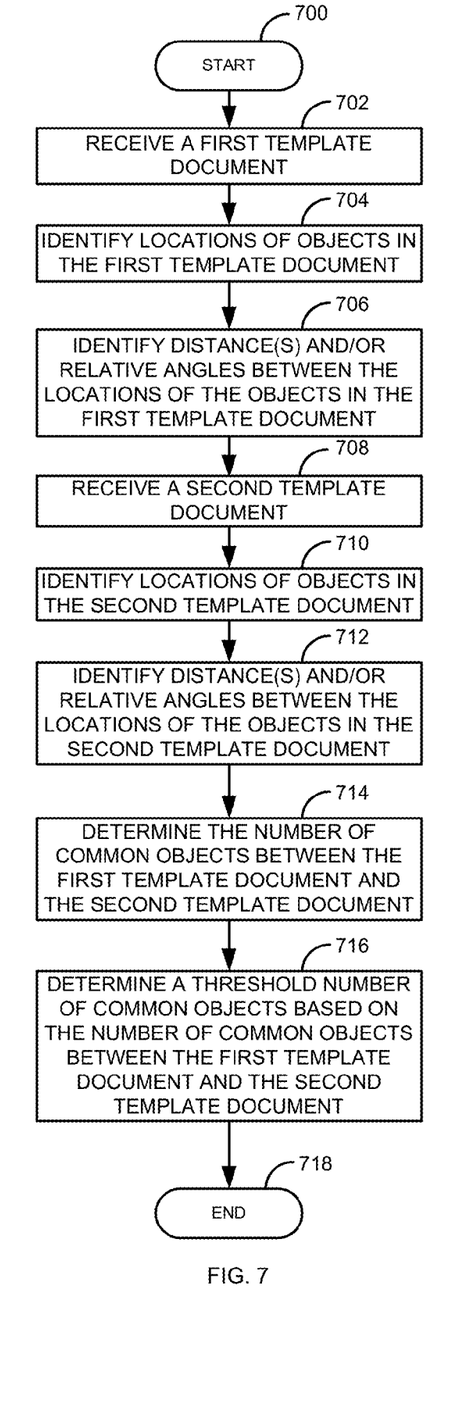
FIG. 7 is a flow diagram of a process for determining a threshold number of objects based on a number of common objects in two template documents.

FIG. 5 is a flow diagram of a process for grouping documents using distances between objects in the documents. Illustratively, the document manager 110, the document scanner 111, the document processor 112, the document classifier 113, the computer 130, the server 131, and the network scanner 133 are stored-program-controlled entities, such as a computer or processor, which performs the method of FIGS. 5-7 and the processes described herein by executing program instructions stored in a tangible computer readable storage medium, such as a memory or disk. Although the methods described in FIGS. 5-7 are shown in a specific order, one of skill in the art would recognize that the steps in FIGS. 5-7 may be implemented in different orders and/or be implemented in a multi-threaded environment. Moreover, various steps may be omitted or added based on implementation.

The process starts in step 500. The process receives the template document 101 in step 502. The process receives the reference document 102 in step 504. The process identifies objects in the template document 101 and the reference document 102 in step 505. The process identifies common objects between the template document 101 and the reference document 102 in step 506. The process identifies locations of the common objects in the template document 101 in step 508. The process identifies the distances between the locations of the common objects in the template object 101 in step 510. The process identifies the locations of the common objects in the reference document 102 (e.g., in a similar manner as the template document 101) in step 512. The process identifies the distances between the locations of the common objects in the reference document 102 in step 514.

The process determines if the distances between the common objects in the template document 101 and the common objects in the reference document 102 are substantially the same in step 516. If the distances between the common objects in the template document 101 and the distances between the common objects in the reference document 102 are substantially the same in step 518, the process groups the template document 101 and the reference document 102 as common documents in step 520 and the process goes to step 524. Otherwise, if the distances between the common objects in the template document 101 and the reference document 102 are not substantially the same, the process groups the documents as not common documents in step 522 and the process goes to step 524.

If there are more reference documents 101 in step 524, the process gets the next reference document 102 in step 526 and the process goes to step 512 to repeat the process for the next reference document. Otherwise, if there are no more reference documents in step 524, the process ends in step 528.

FIG. 6 is a flow diagram of a process for grouping documents using distances and relative angles between objects in the documents. The process described in FIG. 6 is used in conjunction with the elements of FIG. 5. After identifying the locations of the common objects in the template document 101 in step 508 of FIG. 5, the process identifies locations of common objects in the template document 101 based on a orientation point, a height, a width, a font, a DPI, and/or the like in step 600. An orientation point could be anywhere within or around an object. For example, in FIGS. 3 and 4, the orientation point is in the lower left hand corner of the text object. In other embodiments, the orientation point may be in the center of the object. The location may be based on the height of the object. For instance, the reference point can be based on the center point and the height of the object.

The process identifies the distances between the locations of the common objects in the template document 101 in step 602. The process identifies relative angles between the common objects in the template document 101 in step 604. The relative angles between the plurality of common objects in the template document are based on an orientation of respective objects in the template document 101.

The process then completes steps 512-514 of FIG. 5. The process identifies the relative angles between the common objects in the reference document 102 in step 606. The process determines that the distances/relative angles between the common objects in the template document 101 and the reference document 102 are substantially the same in step 608. The relative angles between the plurality of common objects in the template document are based on an orientation of respective objects in the reference document 102. If the distances/relative angles between the common objects in the template document 101 and the reference document 102 are substantially the same in step 610, the process goes to step 520. Otherwise, the process goes to step 522.

FIG. 7 is a flow diagram of a process for determining a threshold number of common objects based on a number of common objects in two template documents 101. For example, the two template documents may be two different types of invoices or contracts from a company. This process is used to identify a threshold number of common objects that will be used to distinguish between the two types of documents.

The process starts in step 700. A first template document 101 is received in step 702. The process identifies the locations of objects in the first template document 101 in step 704. The process identifies distances and/or relative angles between the locations of the objects in the first template document 101 in step 706.

The process receives a second template document 101 in step 708. The process identifies in step 710 the locations of objects in the second template document 101. The process identifies distances and/or relative angles between the locations of objects in the second template document 101 in step 712. The process determines a number of common objects between the first template document 101 and the second template document 101 in step 714.

The process determines in step 716 a threshold number of common objects based on the number of common objects between the first template document 101 and the second template document 101. The threshold number of objects can be based on various factors. For example, the threshold number of common objects may be based on if the two template documents have a high percentage of common objects. The higher number of common objects, the higher the threshold number will have to be in order to distinguish between two types of documents. The process may also look at other factors, such as not common objects.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, by a processor, a first template document, wherein the first template document comprises a first plurality of text objects; and
   receiving by the processor, a reference document, wherein the reference document comprises second a plurality of text objects, wherein at least one of the first template document and the reference document are misaligned or upside down during the following steps:
      identifying by the processor, the first plurality of text objects in the first template document;
      identifying by the processor, the second plurality of text objects in the reference document;
      identifying by the processor, a plurality of common identical text objects between the first template document and the reference document;
      identifying by the processor, locations of the plurality of common identical text objects in the first template document;

identifying by the processor, two or more distances between the locations of the plurality of common identical text objects in the first template document;

identifying by the processor, locations of the plurality of common identical text objects in the reference document;

identifying by the processor, two or more distances between the locations of the plurality of common identical text objects in the reference document;

determining, by the processor, that the two or more distances between the plurality of common identical text objects in the first template document are within a given percentage of variance as the two or more distances between the plurality of common identical text objects in the reference document; and in response to determining that the two or more distances between the plurality of common identical text objects in the first template document are within the given percentage of variance as the two or more distances between the plurality of common identical text objects in the reference document, grouping the first template document and the reference document as common documents, wherein an endpoint of a first one of the two or more distances between the plurality of common identical text objects in the first template document is used as a starting point for a second one of the two or more distances between the plurality of common identical text objects in the first template document and wherein an endpoint of a first one of the two or more distances between the plurality of common identical text objects in the reference document is used as a starting point for a second one of the two or more distances between the plurality of common identical text objects in the reference document.

2. The method of claim 1, further comprising:

identifying two or more relative angles between the plurality of common identical text objects in the first template document, wherein the two or more relative angles between the plurality of common identical text objects in the first template document are based on an orientation of respective identical text objects in the first template document;

identifying two or more relative angles between the plurality of common identical text objects in the reference document, wherein the two or more relative angles between the plurality of common identical text objects in the reference document are based on an orientation of respective identical text objects in the reference document; and wherein grouping the first template document and the reference document as common documents is also based on determining that the two or more relative angles between the plurality of common identical text objects in the first template document are within the given percentage of variance as the two or more relative angles between the plurality of common identical text objects in the reference document; and wherein a first one of the two or more relative angles between the plurality of common identical objects in the first template document is used as a basis to determine a second one of the two or more relative angles between the plurality of common identical objects in the first template document and wherein a first one of the two or more relative angles between the plurality of common identical objects in the reference document is used as a basis to determine a second one of the two or more relative angles between the plurality of common identical objects in the reference document.

3. The method of claim 1, wherein determining that the plurality of distances are within the given percentage of variance is based on a relative distance using a number of Dots Per Inch (DPI) between the plurality of common identical text objects in the first template document and the plurality of common identical text objects in the reference document.

4. The method of claim 1, wherein the identifying the two or more distances between the plurality of common identical text objects in the reference document is based on at least one of a serial pattern, a plurality of serial patterns, a star pattern, a plurality of star patterns, and a tree pattern, a plurality of tree patterns, a mesh pattern, a random pattern, and a combination of these.

5. The method of claim 1, further comprising: determining a threshold number of text objects based on the plurality of common identical text objects between the first template document and a second template document.

6. The method of claim 1, wherein the first plurality of text objects and the second plurality of text objects are identified using a horizontal vector and a vertical vector.

7. The method of claim 1, wherein determining that the first template document and the reference document are within the given percentage of variance further comprises: comparing at least one of a height, a width, a font, and a Dots Per Inch (DPI) of a common identical text object in the template document.

8. The method of claim 1, wherein the first template document and the reference document are at least one of: scanned in by a network scanner, retrieved from a database on a network, and received from a computer on the network.

9. A system comprising:

a document processor, comprising a processor, that receives a first template document, wherein the first template document comprises a first plurality of text objects, receives a reference document, wherein the reference document comprises second a plurality of text objects, wherein at least one of the first template document and the reference document are misaligned or upside down during the following: identify the first plurality of text objects in the first template document, identify the second plurality of text objects in the reference document, identify a plurality of common identical text objects between the first template document and the reference document, identify locations of the plurality of common identical text objects in the first template document, identify two or more distances between the locations of the plurality of common identical text objects in the first template document, identifying locations of the plurality of common identical text objects in the reference document, identify two or more distances between the locations of the plurality of common identical text objects in the reference document, and determining that the two or more distances between the plurality of common identical text objects in the first template document are within a given percentage of variance as the two or more distances between the plurality of common text objects in the reference document, wherein an endpoint of a first one of the two or more distances between the plurality of common identical text objects in the first template document is used as a starting point for a second one of the two or more distances between the plurality of common identical text objects in the first template document and wherein an endpoint of a first one of the two or more distances between the plurality of common identical text objects in the reference document is used as a starting point for a second one of the two or more distances between the plurality of common identical text objects in the reference document; and a document classifier configured to group the first template document and the reference document as common documents in response to determining that the two or more distances between the plurality of common identical text objects in the first template document are within the given percentage of variance as the two or more distances between the plurality of common identical text objects in the reference document.

10. The system of claim 9, wherein:

the document manager identifies two or more relative angles between the plurality of common identical text objects in the first template document, wherein the two or more relative angles between the plurality of common identical text objects in the first template document are based on an orientation of respective identical text objects in the first template document, and identifies two or more relative angles between the plurality of common identical text objects in the reference document, wherein the two or more relative angles between the plurality of common identical text objects in the reference document are based on an orientation of respective identical text objects in the reference document, wherein a first one of the two or more relative angles between the plurality of common identical objects in the first template document is used as a basis to determine a second one of the two or more relative angles between the plurality of common identical objects in the first template document and wherein a first one of the two or more relative angles between the plurality of common identical objects in the reference document is used as a basis to determine a second one of the two or more relative angles between the plurality of common identical objects in the reference document; and the document classifier groups the first template document and the reference document as common documents is based on determining that the two or more relative angles between the plurality of common identical text objects in the first template document are within the given percentage of variance as the two or more relative angles between the plurality of common identical text objects in the reference document.

11. The system of claim 9, wherein determining that the plurality of distances are within the given percentage of variance is based on a relative distance using a number of Dots Per Inch (DPI) between the plurality of common identical text objects in the first template document and the plurality of common identical text objects in the reference document.

12. The system of claim 9, wherein the identifying the two or more distances between the plurality of common identical text objects in the reference document is based on at least one of a serial pattern, a plurality of serial patterns, a star pattern, a plurality of star patterns, and a tree pattern, a plurality of tree patterns, a mesh pattern, a random pattern, and a combination of these.

13. The system of claim 9, further comprising determining a threshold number of text objects based on the plurality of common identical text objects between the first template document and a second template document.

14. The system of claim 9, wherein determining that the first template document and the reference document are within the given percentage of variance further comprises: comparing at least one of a height, a width, a font, and a Dots Per Inch (DPI) of a common identical text object in the template document.

15. The system of claim 9, further comprising at least one of: a network scanner that scans the first template document and the reference document, a database that sends the first template document and the reference document, and a computer that sends the first template document and the reference document.

16. The method of claim 1, wherein the template document has a logo that is used as a starting point to identify the first plurality of text objects.

17. The method of claim 1, wherein the location of the plurality of common identical text objects between the first template document and the reference document are identified based on a first character of the common identical text objects.

18. The method of claim 1, further comprising:
determining a first starting point of the first one of the two or more distances in the first template document; and
determining a second starting point of the first one of the two or more distances in the reference document, wherein the first and second starting points are different due to the misaligned or upside down one or more of the first template document and the reference document.

19. The method of claim 2, wherein the grouping the first template document and the reference document as common documents is based the first and second one of the two or more relative angles between the plurality of common identical objects in the first template document and the first and second one of the two or more relative angles between the plurality of common identical objects in the first reference document being the same.

20. A method comprising:
receiving, by a processor, a template document, wherein the template document comprises a first plurality of text objects; and
receiving, by the processor, a reference document, wherein the reference document comprises second a plurality of text objects, wherein at least one of the template document and the reference document are misaligned or upside down during the following steps:
a) identifying, by the processor, the first plurality of text objects in the template document;
b) identifying, by the processor, the second plurality of text objects in the reference document;
c) identifying, by the processor, a plurality of common identical text objects between the template document and the reference document;
d) identifying, by the processor, a first location of a beginning character for a first common identical text object in the template document;
e) identifying, by the processor, a second location of a beginning character for a second common identical text object in the template document;
f) determining, by the processor, a first vector for the first common text object in the template document using a distance between the first location and the second location;
g) identifying, by the processor, a third location of a beginning character for the first common identical text object in the reference document;
h) identifying, by the processor, a fourth location of a beginning character for the second common identical text object in the reference document;
i) determining, by the processor, a second vector for the first common text object in the template document;
j) comparing, by the processor, the first vector to the second vector;
k) determining, by the processor, that the first and second vectors are within a given percentage of variance; and l) repeating, by the processor, the process of steps a-k using the second and fourth locations as a starting point for one or more additional common text objects; and in response to determining that the compared vectors are within the given percentage of variance, grouping, by the processor, the first template document and the reference document as common documents.

\* \* \* \* \*